United States Patent [19]

Landry et al.

[11] Patent Number: 4,687,230
[45] Date of Patent: Aug. 18, 1987

[54] NAUTICAL CHART FOR PILOTING

[76] Inventors: John M. Landry, Sassaman Ct., Punta Gorda, Fla. 33955; Paul L. Ravenna, Rd. 1, Box 33B, Waitsfield, Vt. 05673

[21] Appl. No.: 817,490
[22] Filed: Jan. 9, 1986
[51] Int. Cl.⁴ .............................................. B42P 15/00
[52] U.S. Cl. ........................................ 283/34; 434/150
[58] Field of Search ................... D19/61; 283/34, 35; 434/130, 147, 150, 151, 152, 153

[56] References Cited

U.S. PATENT DOCUMENTS

| | | | |
|---|---|---|---|
| 891,272 | 6/1908 | Loewe | 283/34 |
| 1,364,239 | 1/1921 | Bloomfield . | |
| 1,390,079 | 9/1921 | Bloomfield | 283/34 |
| 1,429,285 | 9/1922 | Harriman . | |
| 1,537,634 | 5/1925 | Watson | 434/150 |
| 1,820,115 | 8/1931 | Blair | 283/34 |
| 4,289,333 | 9/1981 | Gaetano | 283/35 |

FOREIGN PATENT DOCUMENTS

| | | | |
|---|---|---|---|
| 2215635 | 10/1973 | Fed. Rep. of Germany | 434/150 |
| 255484 | 7/1926 | United Kingdom | 283/34 |
| 2140956 | 12/1984 | United Kingdom | 434/150 |

OTHER PUBLICATIONS

The Miami to Card Sound Marine chart by U.S. Master, published by Cartographic Corporation, Box 88, Manchester, Massachusetts 01944.
The Galveston Bay fishing map published by Hooksetter Fishing Maps, P.O. Box 7330, Bay Plaza Station, Baytown, Texas 77520.

Primary Examiner—Paul A. Bell
Attorney, Agent, or Firm—Fisher, Christen & Sabol

[57] ABSTRACT

This invention is a nautical chart intended primarily for small craft navigation. The nautical chart includes a representation of a shoreline on at least one side of a single sheet of flexible material. The representation of the shoreline includes at least one small scale chart and a plurality of large scale charts. Both large scale and small scale charts are suitable for piloting. A substantially continuous shoreline is represented by a combination of the plurality of large scale charts. The large scale charts can be an extension of the shoreline of the small scale chart, overlap the shoreline of the small scale charts, or both.

17 Claims, 6 Drawing Figures

NAUTICAL CHART FOR PILOTING

BACKGROUND OF THE INVENTION

1. Field of the Invention

This invention relates to an arrangement of nautical charts on a single sheet of flexible material or paper that is suitable for piloting. In particular, this invention relates to an arrangement of nautical charts on a single sheet of, desirably, waterproof paper having at least one small scale chart and a plurality of large scale charts whereby the combination of all the charts represents a substantially continuous shoreline.

2. Description of the Prior Art

Piloting is commonly defined as navigating a craft in optical or electronic sight of land. Electronic sight can include the use of RADAR equipment to identify objects on the shore. The position of the craft in the water is calculated by a navigational method known as triangulation. Triangulation consists of obtaining a magnetic compas or gyro compass bearing of an optical or electronic line of sight from the small craft to two or more specific landmarks on the shore. The landmarks are identified on a chart of the shoreline and lines are drawn on the chart from the representations of the objects at angles corresponding to the angles of the lines of sight. The point of intersection of the lines drawn on the chart is the navigational position or "fix" of the small craft. Explanations of piloting and navigation can be found in many reference texts including *Piloting and Dead Reckoning* by Shufeldt and Dunlap, published by the Naval Institute Press, 1970.

Piloting charts present sufficient detail of a shoreline to represent specific landmarks that can be recognized from a vessel on the water and in sight of the shoreline depicted by the chart. Charts of harbors or inlets are usually rendered in 1:40,000 scale or less frequently in 1:10,000 scale. These scales represent a small nautical and geographic area and are termed large scale charts. Coastwise charts, embracing stretches of shoreline that contain several harbors often have a 1:80,000 scale. This scale represents a relatively large nautical or geographical area and is termed a small scale chart. Small scale charts bear the name of the area that they depict or cover such as "Tampa Bay" or Long Island Sound-Eastern Part.

Open ocean navigational charts are much smaller in scale than are charts used for piloting. Open ocean navigational charts depict large areas of ocean and typically contain no shoreline detail. Open ocean navigational charts have a 1:1,000,000 scale or larger.

As can be appreciated a small scale chart is one in which features are presented in smaller size and less detail than on a large scale chart. The demarcations between large scale and small scale charts is relative. For this reason the descriptions above are provided as a general guide to the terms used in the art.

Special folio-style charts, known as Small Craft Charts, are published for areas that have a significant amount of small craft traffic. These charts have several fold-out segments stapled together in protective covers along with tidal and harbor facility information. These charts are considered easier to use in a confined cockpit of a skiff or daysailer than are the large format navigational charts used on larger vessels. Small Craft Charts usually represent a shoreline in a 1:40,000 scale. The user of these charts can obtain navigational information by flipping through the charts printed on small sheets of paper and attached together in a book format.

The user of Small Craft Charts cannot obtain a "total picture" of all the shoreline represented all by the charts without disassembling the charts from one another and fitting them together. A book format as used in Small Craft Charts does not lend itself to navigational plotting because sight lines from a landmark often cross over onto another chart. Additionally, Small Craft Charts often do not contain sufficient number of large scale charts of restricted navigational waters to provide adequate detail for the navigator of these waters. This lack of large scale charts requires the small craft navigator to have separate large scale charts on board his vessel.

Desirable piloting charts are of a sufficient size to permit the navigator to draw sight lines or "readings" on the chart. Conventional piloting charts available from the U.S. National Oceanic and Atmospheric Administration (NOAA) are typically printed on only one side of a large sheet of paper. Paper sizes for NOAA charts are often about three feet in height and three and one-half to four feet in width. NOAA charts of this size frequently contain only one chart of a single scale to depict the shoreline representation presented by the chart. Piloting charts of this nature are too large and cumbersome for use on a small craft that has no chart table. Piloting charts, because of their size, must often be folded in order to be handled on a small craft. When a chart is folded the navigator of the craft loses the benefit of quick reference to all the information presented on the chart. Additionally, charts are frequently carried on board small craft in transparent plastic pouches or "chart pockets". If the chart is carried in a waterproof chart pocket, folding the chart by removing the chart from the pocket exposes the chart to the elements. If the chart is folded along with the chart pocket, the chart pocket can be permanently creased or destroyed.

Examples of navigational charts including small craft charts are found in patents, technical literature, and actual commercially available charts. The following specific examples are provided.

The Miami to Card Sound marine chart by U.S. Master ® published by Cartographic Corporation Box 88, Manchester, Mass. 01944, is an example of a waterproof chart depicting two small scale charts and a number of related large scale charts that define only very narrow sections of shoreline. The large scale charts taken in combination do not represent a substantially continuous section of shoreline. Insert Number 1 of Miami Beach illustrates a seven mile stretch of a Miami channel. This channel is presented on such a small section of the overall chart representation that size constraints do not provide enough surface area for the navigator to chart repeated fixes when navigating the channel. The small scale charts do not depict sufficient landmarks to facilitate the navigator's plotting of his position. Under foul weather conditions an inadequate number of landmarks depicted on a piloting chart render that chart useless because of the restricted visability.

U.S. Pat. No. 1,429,285 to Harriman discloses a waterway chart. The waterway chart graphically expresses facts concerning waterways and other bodies of water and their relation to commercial, industrial and recreational uses. Selective facts concerning the seacoast, the rivers entering the sea along this seacoast, and the tributaries and lakes connected to these rivers are shown. This chart is not intended or suitable for piloting small craft. The length of sea coast illustrated in this waterway chart is printed on sizes or paper having insufficient area to draw repeated fixes when navigating the coastline. There are no distinct landmarks depicted on the coastline of this chart.

The Galveston Bay fishing map published by Hooksetter Fishing Maps, P.O. Box 7330, Bay Plaza Station, Baytown, Tex. 77520, is an example of a waterproof chart for small craft. This fishing chart depicts a number of large scale charts in its inserts. The combined charts are arranged on one sheet of paper in a manner suitable for use while fishing in specific areas of the bay. The large scale charts do not depict a substantially continuous section of shoreline in a suitable manner to readily facilitate navigating from the areas depicted by one large scale chart to an area depicted by another large scale chart. Small craft navigating between the different areas depicted by the large scale charts is made cumbersome by the lack of a substantially continuous representation of shoreline in the large scale charts.

Cartographers, when producing maps, encounter difficulties similar to those described above when presenting detailed map information on large scale maps in conjunction with general information presented in a small scale map. A map is a representation of a land surface. Road maps are generally depicted in the form or a large folded sheets of paper. Small scale road maps are generally not detailed enough to provide a guide through cities or towns contained in the territory covered by the map. Cartographers have attempted to solve these problems in numerous ways.

U.S. Pat. No. 1,364,239 to Bloomfield discloses a scroll map. The map is arranged in a form such that the map can be compactly arranged in a small space convenient for ready reference. The map represents a given geographical area divided into a number of parallel sections. The parallel sections are arranged in a parallel single line on a single strip of paper that is mounted at each end on rollers. The map illustrates a given area as well as enlargements of certain portions of the geographical areas. The map sections are arranged in an order such that a traveler can determine his position while travelling to a given destination. The user must shift the strip map from one section to another to determine his position on the map. A number of sections representing a substantially continuous road are not simultaneously viewable. A chart having similar construction is not suitable for piloting small craft because of the cumbersome nature of a scroll format and the inability of the navigator to plot on portions of the scroll without the scrolls unrolling as his small craft is tossed about by waves.

U.S. Pat. No. 1,537,634 to Watson discloses a road map. Map sections are provided in sheets which can be attached in a book format. One using the road map can organize a tour by placing map section sheets in the book in a sequence corresponding to the chosen route. The book can then be conveniently handled by the automobile tourist while driving. The map sections in the book are not simultaneously viewable. A chart having similar construction is not suitable for piloting small craft for the same reasons as detailed above for the Small Craft Charts.

The industry lacks a chart for use with small craft piloting and navigation that illustrates on a single sheet of paper a substantially continuous shoreline. The industry lacks charts suitable for piloting that provide the small craft navigator with an acceptable arrangement of chart information on a single sheet of flexible material or paper for quick and easy use when navigating near a shoreline.

SUMMARY OF THE INVENTION

Figure 1A:
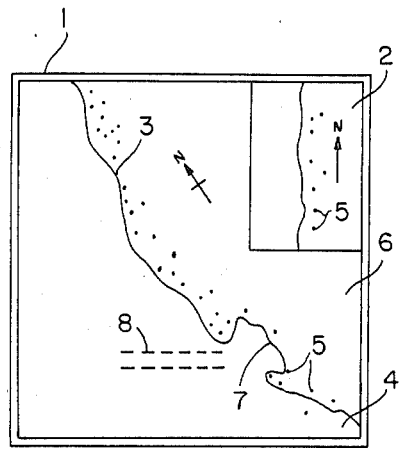
FIG. 1A illustrates a nautical chart according to the invention having a combination of indicia including one large scale representation of a shoreline and a small scale representation illustrating an extension of the shoreline.

This invention is a navigational chart comprising a representation of a shoreline. The representation of the shoreline is on at least one side of a sheet of flexible material. The representation has indicia including at least one small scale chart and a plurality of large scale charts. The plurality of large scale charts are in toto a depiction of a substantially continuous portion of the shoreline. The substantially continuous portion of the shoreline is selectively represented by the indicia in at one of two conditions. The first condition is one wherein the substantially continuous portion of the shoreline represented by the large scale charts is an extension of the shoreline of the small scale chart. The second condition is one wherein the substantially continuous portion of the shoreline of the large scale charts overlaps the shoreline of the small scale chart.

DETAILED DESCRIPTION OF THE INVENTION

This invention is a nautical chart primarily suitable for use in small craft piloting and navigation within visual or electronic sight of a shoreline. The nautical charts according to this invention include a representation of a section of shoreline. The representation is desirably on both sides of a sheet of flexible material or paper. The most desirable flexible material is waterproof paper that can be removably written upon with a pencil. The representation of the shoreline has indicia that includes at least one small scale chart and a plurality of large scale charts. The combination of the plurality of large scale charts represents a substantially continuous portion of a shoreline. The relationship or combination of the large scale charts to the small scale chart is in at least one of two conditions. The first of these conditions is one wherein the substantially continuous portion of shoreline of the large scale charts is an extension of the shoreline represented by the small scale chart. The second of these conditions is one wherein the substantially continuous portion of the shoreline of the large scale charts overlaps the shoreline represented by the small scale chart. The total combination of the plurality of large scale charts and the one or more small scale charts for a navigational area form a nautical chart according to this invention.

This invention is a nautical chart primarily suitable for use on board a small craft. A small craft for the purposes of this invention is a vessel suitable for sailing either on inland waters or at sea wherein a single individual both controls the rudder of the vessel and navigates the vessel. A small craft is frequently only navigated within visual or electronic sight of the shoreline. Typically, a small craft is a vessel on which there is insufficient space for a navigating table.

The nautical charts according to this invention provide large and small scale chart information of waterway areas within optical or electronic sight of a shoreline. The dimension of the waterway areas from the shoreline to be depicted on the charts are calculated to be within the distance to the horizon of a line of sight from an average small craft. This distance can vary depending upon the height of eye of the small craft operator above the surface of the water. The waterway area distance from the shoreline depicted on nautical charts according to this invention is typically within a range or distance from the shoreline of approximately one-half mile to approximately twenty miles. Large and small scale charts used int he nautical charts according to this invention depict an amount of chart information of the inland shore area approximately equal to the amount of waterway area depicted on a specific large or small scale chart. The ratio of waterway area to shore area depicted in a large or small scale chart used in the nautical charts according to this invention is desirably about one to one.

The nautical chart according to this invention includes a representation of a section of substantially continuous shoreline being presented on at least one side of a single sheet of flexible material or paper. The representation of the length of shoreline presented in toto the large and small scale charts forming the nautical charts according to this invention must be sufficient to enable the small craft operator to said in a significant portion of the navigational waters. Typically, the total length of shoreline depicted in the nautical charts of this invention are between about two miles to about one hundred miles of continuous shoreline. The amount of shoreline represented in a particular nautical chart varies depending upon the restrictions to navigation in the particular waterway area. Sections of the shoreline represented in the nautical charts of the invention are oriented for ready reference so as to be available for quick and easy reference without the need for the user to consult other charts or the reverse side of the nautical chart.

The representation of the shoreline depicted in the nautical charts of this invention includes at least one small scale chart and a plurality of large scale charts. The small scale chart provides an overall view or the "big picture" of the most critical portions of a shore area, such as a city, or of the waterway area, such as a harbor or channel. The small scale chart enables the navigator to obtain a rapid reference or a rough plot of his position. The large scale charts provide more details of navigational objects than is provided by a small scale chart. Small scale charts provide either (1) detailed navigational data of an area not having a significant concentration of navigational objects or (2) detailed navigational data of an area of hazardous navigation. Both the large and small scale charts used in this invention depict recognizable navigational objects and are of a sufficient size to permit the navigator to draw repeated readings or sight lines on the chart to permit the plotting of repeated fixes for deriving a course line. It is mose desirable in the nautical charts according to this invention when the small scale charts are of a scale of about 1:80,000 and the large scale charts are of a scale of between about 1:10,000 and 1:40,000. These scales provide charts suitable for plotting.

Nautical charts according to this invention present combinations of large and small scale charts in at least one of the two conditions. The first or these two conditions is a presentation of large scale charts used to extend the shoreline of the small scale chart. The second of these two conditions is a presentation of large scale charts used to overlap the shoreline of the small scale chart. This is most desirably an overlapping of an area having either a dense concentration of navigational objects or restricted navigational waters.

The most desirable ratios of small scale charts to large scale charts presented on one or more sides of a single sheet of flexible material are between about 1:2 to between about 1:7, respectively. The most desirable ratio of small scale charts to large scale charts presented on only one side of a sheet of flexible material is about 1:3 respectively. With these ratios of small scale charts to large scale charts, the percent of the surface area of the flexible material devoted to small scale charts is desirably between about 25 and about 60 percent. The percent of surface area of the felxible material devoted to the small scale charts is desirably within this percentage whether one or both sides of the flexible material in used for the printing of the large and small scale charts of this invention. This percentage provides a small scale chart of sufficient size to permit the plotting of a navigational course when the dimensions of the flexible material are as described below. It is most desirable that the surface area of the flexible material devoted to the large scale charts to be at least 50 percent and include at least four large scale charts of dimensions sufficient to permit plotting. For example, when a single small scale chart is present on one side of a sheet of flexible material the reverse side of the flexible material can contain the four or more large scale charts. This combination, when the nautical chart according to this invention has the dimensions described below, presents individual large and small scale charts that each have a sufficient surface area for plotting.

These ratios and percentages can be varied according to the needs of a particular navigational area. The desirable ratios and percentages identified above provide a nautical chart that can be rapidly used by a navigator to obtain a rough fix of his position with only a glance at the chart. The desirable ranges also provide the navigator with ample surface area to plot a course on any of the large or small scale charts when the flexible material is of a dimension as described below.

The total combination of large and small scale charts that form the nautical charts of this invention are arranged on a single piece of flexible material or paper. The flexible material is of a size adapted or suitable for both holding and viewing one side of the nautical chart in an unfolded condition by a single person. Dimensions of sheets of flexible material for the nautical charts according to this invention are desirably at least about eighteen inches by about twenty-four inches. The maximum desirable dimensions of the flexible material used in this invention is up to about three feet by about four feet. These dimensions of flexible material are generally smaller than the dimensions used for commercial charts suitable for ocean-going vessels. The smaller dimensions used in this invention provide a nautical chart that is more easily handled and viewed on board a vessel or small craft without a chart table.

Both the large and small scale charts must be dimension sufficient to permit plotting. This dimension can vary. Desirably the dimensions about the perimeter of a rectangular large scale chart is at least about five inches by about eighteen inches. This is a size sufficient to permit plotting. Desirably the small scale chart has larger dimensions than any of the large scale charts.

The large and small scale charts used to form the nautical chart of this invention can desirably be compilations of reproduced charts or portions of charts currently published by government or other sources. The charts or portions of charts are selected to illustrate desired waterway areas and shore areas. The portions of waterway area or shore area that are undesirable for use in the nautical charts of this invention can be excluded from reproduction. It is desirable to reproduce or print the chart information on nautical charts according to this invention in the same colors as used on NOAA charts. These colors maintain contrast from one another when viewed under red light such s those used during the night on chart tables and interior spaces of nautical vessels.

The nautical charts according to the invention can be printed on a single sheet of any suitable flexible material or paper. In the preferred embodiment of this invention waterproof, tear resistant paper is used as a flexible material. Waterproof paper that can be removably written upon is preferable. An acceptable waterproof paper is sold under the mark Kim Dura ® by the Kimberly Clarke Company. Kim Dura ® brand paper can be removably written upon with pencil. The pencil marking can be washed off with water without removing the ink from the paper. If an eraser is used to remove writing from Kim Dura ® brand paper, some or all of the ink can be removed by the eraser. Printing on Kim Dura ® brand paper can require special procedures, but is within the skill of art.

FIG. 1A illustrates a nautical chart 1 according to the invention having a combination or arrangement of indicia including one large scale representation or chart 2 that presents a shoreline 3 and a small scale representation or chart 4 that presents an extension of the shoreline 3. Both the large scale chart 2 and the small scale chart 4 contain navigational objects 5 on their respective shore areas 6. The small scale chart 4 includes an overall view of a bay 7 and the channel 8 to the bay.

Figure 1B:
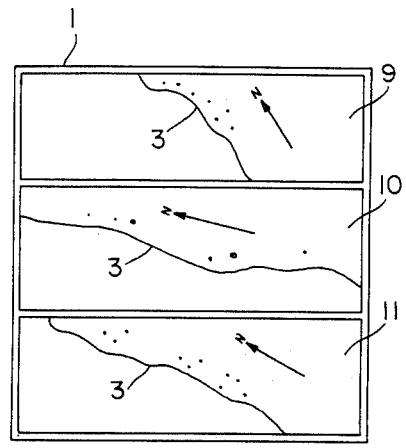
FIG. 1B further illustrates the nautical chart of FIG. 1A having a combination of indicia including three large scale representations extending the same shoreline of FIG. 1A.

FIG. 1B illustrates the reverse side of the sheet of flexible material containing the nautical chart 1 according to the invention having a combination of indicia including three large scale charts 9, 10, and 11 extending the same shoreline 3 of FIG. 1A. The large scale charts 9, 10, and 11 can selectively extend the shoreline 3 in either or both directions of that portion of shoreline 3 presented in the small scale chart 4.

Figure 2A:
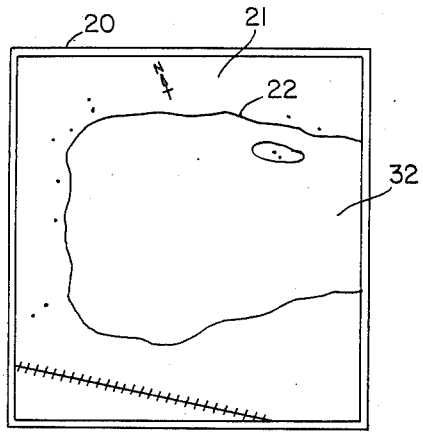
FIG. 2A illustrates one side of a sheet of flexible material presenting a nautical chart containing a small scale representation of a shoreline.

FIG. 2A illustrates one side of a sheet of flexible material presenting a nautical chart 20 containing a small scale chart 21 of a shoreline 22. This small scale chart provides an overall view of a representation of a sound or bay or water area 32. The small scale chart of this figure is not a nautical chart according to the invention unless accompanied with the additional indicia presented in FIG. 2B.

Figure 2B:
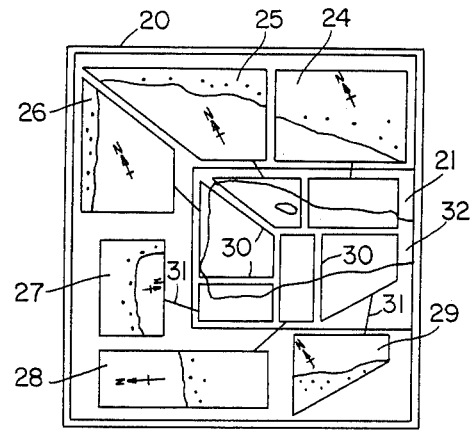
FIG. 2B illustrates one side of a sheet of flexible material presenting a nautical chart according to the invention having a combination of indicia including a reproduction of the small scale chart of FIG. 2A and six large scale charts that overlap the shoreline of FIG. 2A that are presented in border and arrow format.

FIG. 2B illustrates one side of a sheet of flexible material presenting a nautical chart 20 according to the invention having a combination of indicia including a reproduction of the small scale chart 21 of FIG. 2A and six large scale charts 24, 25, 26, 27, 28, and 29. The representations of the shoreline presented in each of these six large scale charts overlap portions of the shoreline 22 of FIG. 2A. A reproduction of the small scale chart 21 of FIG. 2A that is reduced in size is presented in the center of the side of flexible material containing the large scale charts of this figure. Borders 30 are drawn about portions of shoreline 22 appearing in the reduced presentation of the small scale chart 21. Reference lines or arrows 31 extend from the borders 30 to a specific large scale chart that presents an enlargement of the corresponding portion of shoreline 22 appearing within a specific border. This "border and arrow format" allows a navigator to rapidly obtain a reference from a position or fix plotted in the water area 32 on the small scale chart 21 of FIG. 2A to a large scale chart as illustrated in FIG. 2B that presents the same portion of water area containing the position or fix of the vessel.

A nautical chart 20 containing the combination of indicia as illustrated in both FIGS. 2A and 2B allows a navigator to use the small scale chart 21 of one side of the flexible material to navigate in open water. This combination of indicia also provides the navigator with large scale charts of substantially continuous portions of the shoreline 22 for use in navigation in the more shallow depths of water that are close to shore.

The combination of indicia as presented in FIG. 2B can alone represent a nautical chart according to this invention without the reverse side of the flexible material containing any additional indicia. The combination of the small scale chart presented in the center of the nautical chart of FIG. 2B, when accompanied by the large scale charts 24 through 29, provides all the indicia on a single side of flexible material required by the invention. A navigator receives an additional benefit when a small scale chart as presented in FIG. 2A is provide on one side of the sheet of flexible material. This benefit is the availability of a small scale chart suitable in size for plotting a plurality of navigational positions.

Figure 3A:
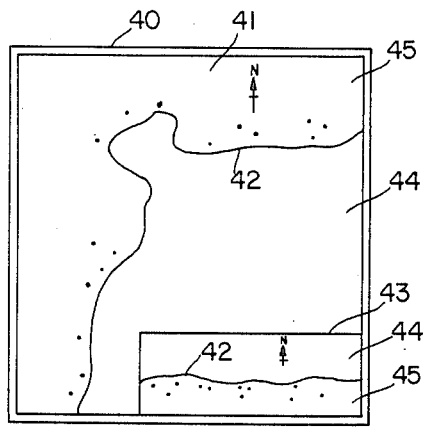
FIG. 3A illustrates one side of a sheet of flexible material presenting a nautical chart according to the invention having a combination of indicia including a small scale chart presenting a shoreline and a large scale chart that presents an extension of the shoreline.

FIG. 3A illustrates one side of a sheet of flexible material presenting a nautical chart 40 according to the invention having a combination of indicia including a small scale chart 41 presenting a shoreline 42 and a large scale chart 43 that presents an extension of the shoreline 42. Both the small scale chart 41 and the large scale chart 43 present portions of a water area 44 and shore area 45.

Figure 3B:
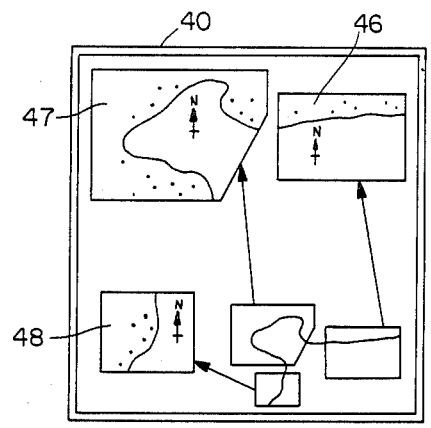
FIG. 3B illustrates a nautical chart according to the invention having a combination of indicia including a reproduction of the small scale chart of FIG. 3A and three large scale charts that overlap the shoreline of of the small scale chart that are presented in border and arrow format.

FIG. 3B illustrates one side of a sheet of flexible material presenting the nautical chart 40 according to the invention having a combination of indicia including a reproduction of the small scale chart 41 of FIG. 3A and three large scale charts 46, 47, and 48 that overlap the shoreline 42 of the reproduction of the small scale chart 41. The border and arrow format described above is also a part of the combination of the indicia of illustrated in this figure. The border and arrow format identifies the portions of substantially continuous shoreline of the small scale chart 41 that are enlarged and presented in the large scale charts 46, 47, and 48.

The combination of indicia provided by the nautical chart 40 as illustrated in both FIGS. 3A and 3B presents large scale charts that both extend and overlap the shoreline of the small scale chart 41. This total combination of indicia as represented by nautical chart 40 is the preferred embodiment of the invention.

What is claimed is:

1. A nautical chart having a combination of indicia comprising:
   (a) a small scale chart having a representation of a shoreline; and
   (b) a plurality of large scale charts, said large scale charts in toto being a representation of a substantially continuous shoreline that extends said shoreline of said small scale chart, said nautical chart being printed on waterproof, tear resistant paper.

2. The nautical chart of claim 1 wherein the ratio of small scale charts to large scale charts are between about 1:2 to between about 1:7, respectively.

3. The nautical chart of claim 2 wherein said nautical chart is printed on a flexible material, said flexible material having between about 25 and about 60 percent of its surface area devoted to said scale charts.

4. The nautical chart of claim 3 wherein said surface area of said flexible material devoted to said large scale charts is at least 50 percent and wherein at least four large scale charts are presented, each of said large scale charts being of a dimension sufficient to permit plotting.

5. The nautical chart of claim 4 wherein said small scale chart is of a scale of about 1:80,000 and said large scale charts are of scales between about 1:10,000 and about 1:40,000.

6. A nautical chart having a combination of indicia comprising:
   (a) a small scale chart having a representation of a shoreline; and
   (b) a plurality of large scale charts, said large scale charts in toto being a representation of a substantially continuous shoreline that overlaps said shoreline of said small scale chart, said nautical chart being printed on waterproof, tear resistant paper and wherein a border surrounds a portion of said small scale chart and an arrow connects said bordered portion of said small scale chart to a corresponding large scale chart.

7. The nautical chart of claim 6 wherein the ratio of small scale charts to large scale charts are between about 1:2 to between about 1:7, respectively.

8. The nautical chart of claim 7 wherein said nautical chart is printed on a flexible material, said flexible material having between about 25 and about 60 percent of its surface area devoted to said scale charts.

9. The nautical chart of claim 8 wherein said surface area of said flexible material devoted to said large scale charts is at least 50 percent and wherein at least four large scale charts are presented, each of said large scale charts being of a dimension sufficient to permit plotting.

10. The nautical chart of claim 9 wherein said small scale chart is of a scale of about 1:80,000 and said large scale charts are of scales between about 1:10,000 and about 1:40,000.

11. A nautical chart having a combination of indicia comprising:
    (a) at least one small scale chart having a representation of a shoreline;
    (b) a plurality of large scale charts, said large scale charts in combination present a substantially continuous shoreline, said substantially continuous shoreline being in at least one of two conditions:
        (i) a first condition wherein said substantially continuous shoreline of said plurality of large scale charts is an extension of said shoreline of said small scale chart; and
        (ii) a second condition wherein said substantially continuous shoreline of said plurality of large scale charts overlaps said shoreline of said small scale chart.

12. The nautical chart of claim 11 wherein the ratio of small scale charts to large scale charts are between about 1:2 to between about 1:7, respectively.

13. The nautical chart of claim 12 wherein said nautical chart is printed on a flexible material, said flexible material having between about 25 and about 60 percent of its surface area devoted to said small scale charts.

14. The nautical chart of claim 13 wherein said surface area of said flexible material devoted to said large scale charts is at least 50 percent and wherein at least four large scale charts are presented, each of said large scale charts being of a dimension sufficient to permit plotting.

15. The nautical chart of claim 14 wherein said small scale chart is of a scale of about 1:80,000 and said large scale charts are of scales between about 1:10,000 and about 1:40,000.

16. The nautical chart of claim 15 wherein said flexible material is a waterproof paper.

17. The nautical chart of claim 16 wherein a border surrounds a portion of said small scale chart and an arrow connects said bordered portion of said small scale chart to a corresponding large scale chart.

* * * * *